United States Patent
Newton

(10) Patent No.: US 6,386,633 B1
(45) Date of Patent: May 14, 2002

(54) ADJUSTABLE VEHICLE SEAT

(75) Inventor: Gerrit Newton, Owen (DE)

(73) Assignee: Recaro GmbH & Co., Kirchheim/Teck (DE)

(*) Notice: Subject to any disclaimer, the term of this patent is extended or adjusted under 35 U.S.C. 154(b) by 0 days.

(21) Appl. No.: 09/564,260

(22) Filed: May 4, 2000

(30) Foreign Application Priority Data

May 5, 1999 (DE) .......................................... 199 20 535

(51) Int. Cl.[7] .............................................. A47C 3/025
(52) U.S. Cl. ................................ 297/284.1; 297/284.11
(58) Field of Search ........................ 297/284.11, 284.1, 297/DIG. 3, DIG. 8, 452.41, 312, 328, 311, 313, 337, 338, 339

(56) References Cited

U.S. PATENT DOCUMENTS

| | | | | |
|---|---|---|---|---|
| 4,589,696 A | * | 5/1986 | Kanai et al. | 297/284.11 |
| 4,629,248 A | * | 12/1986 | Mawbey | 297/284.11 |
| 4,629,253 A | * | 12/1986 | Williams | 297/284.1 X |
| 4,693,513 A | | 9/1987 | Heath | |
| 5,137,329 A | * | 8/1992 | Neale | 297/284.1 X |
| 5,572,933 A | * | 11/1996 | Thompson | 297/284.11 X |
| 5,607,204 A | * | 3/1997 | Gryp | 297/284.11 |
| 5,908,220 A | | 6/1999 | Bauer et al. | |

FOREIGN PATENT DOCUMENTS

| | | |
|---|---|---|
| DE | 31 39 945 A1 | 4/1983 |
| DE | 36 24 398 A1 | 1/1988 |
| DE | 44 23 957 A1 | 1/1996 |
| DE | 196 29 440 A1 | 1/1996 |
| DE | 198 11 958 A1 | 9/1999 |
| EP | 0 204 443 A2 | 12/1986 |
| GB | 2 195 077 A | 3/1988 |

* cited by examiner

*Primary Examiner*—Peter R. Brown
*Assistant Examiner*—Stephen Vu
(74) *Attorney, Agent, or Firm*—Alston & Bird LLP

(57) ABSTRACT

An adjustable vehicle seat comprises a seat cushion positioned on both a seat-shell front part and a seat-shell rear part. The seat-shell front part is formed separately from the seat-shell rear part and mounted for moving relative to the seat-shell rear part, so that the seat-shell front part can be adjusted relative to the seat-shell rear part. As a result of the fact that the seat-shell front part and the seat-shell rear part are formed separately, and the seat-shell front part can be adjusted, in particular independently of the seat-shell rear part, the seat-shell front part can be adapted individually to the seat user in inclination and/or length of the seat surface.

16 Claims, 5 Drawing Sheets

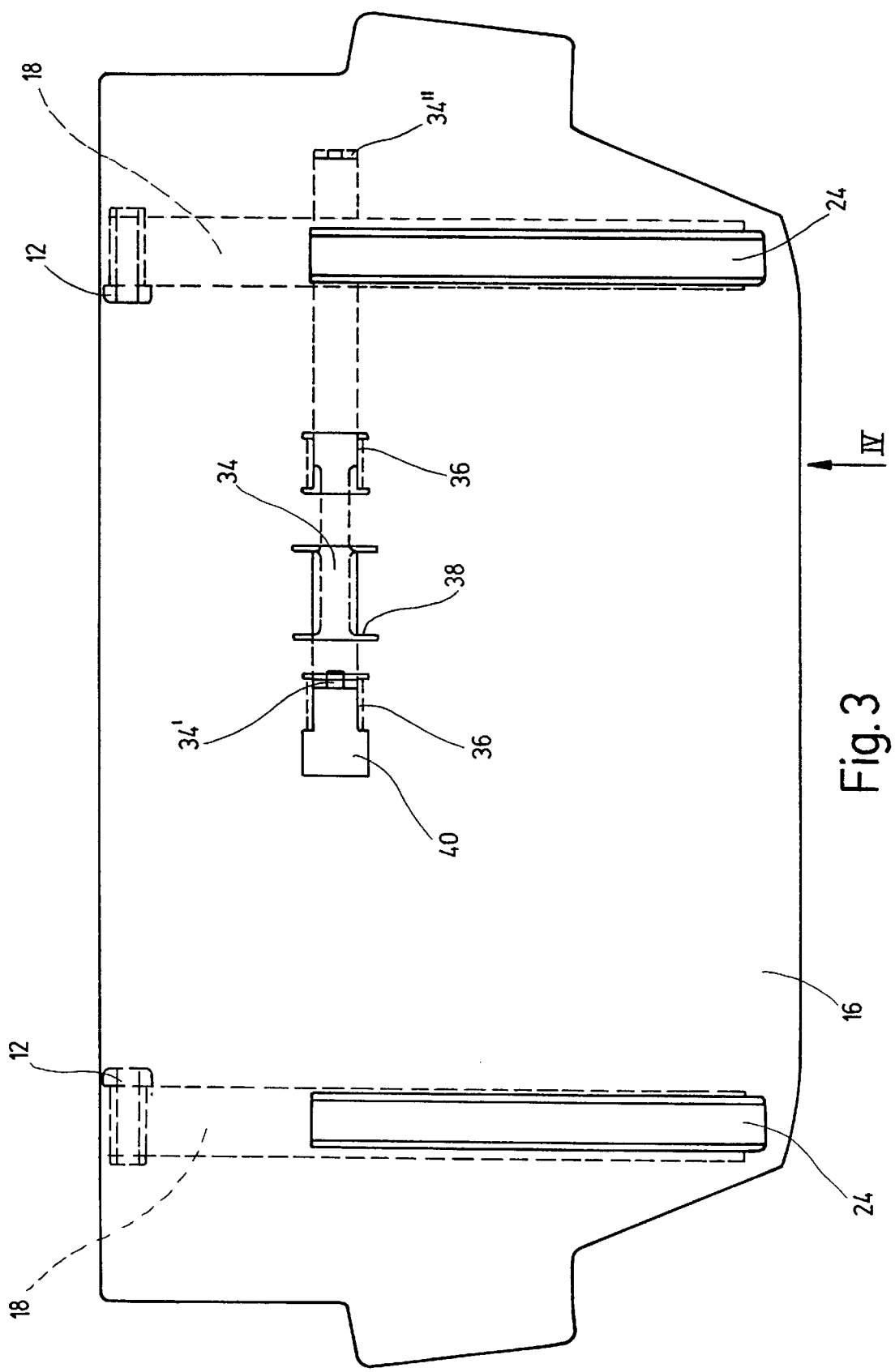

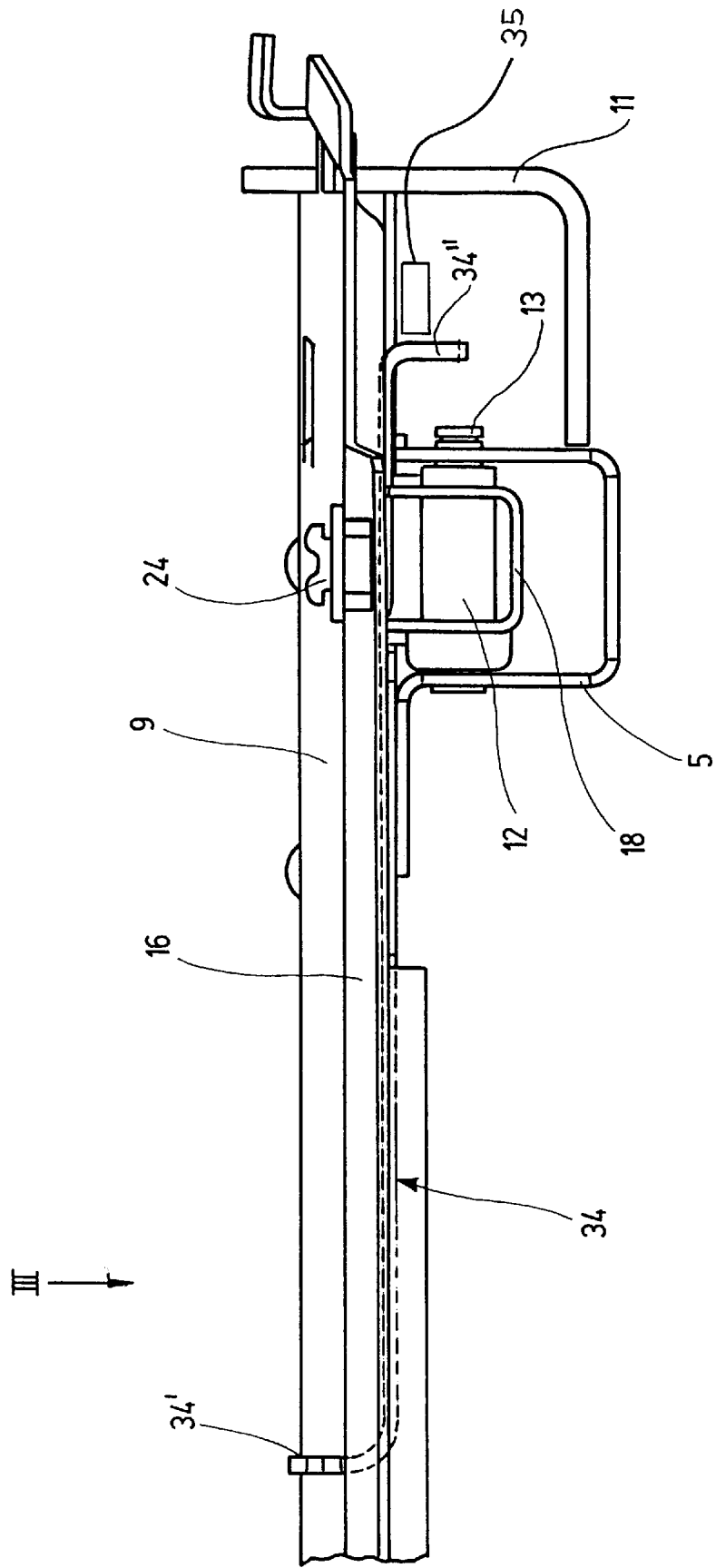

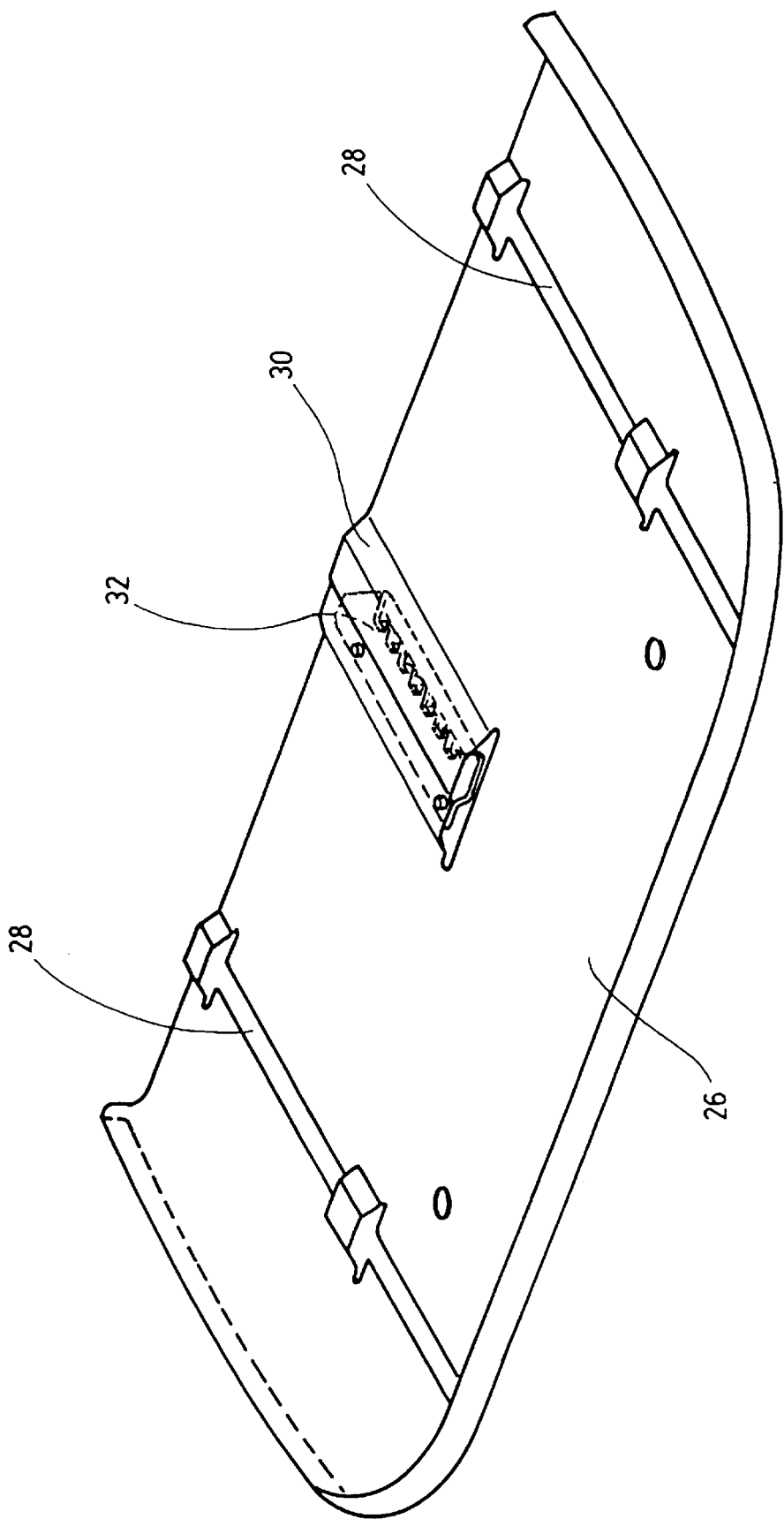

ADJUSTABLE VEHICLE SEAT

BACKGROUND OF THE INVENTION

The present invention relates to an adjustable vehicle seat, in particular for a truck, having at least one structurally fixed part and at least one adjustable part which is movable relative to the structurally fixed part.

A known vehicle seat of this type has a one-piece seat shell on a seat frame which can be adjusted in its entirety, for example vertically by means of a scissors-type substructure.

It is an object of the present invention to provide an improved adjustable vehicle seat of the type mentioned at the beginning.

SUMMARY OF THE INVENTION

In accordance with one aspect of the present invention, an adjustable vehicle seat comprises a seat cushion positioned on both a seat-shell front part and a seat-shell rear part. The seat-shell front part is formed separately from the seat-shell rear part and mounted for moving relative to the seat-shell rear part, so that the seat-shell front part can be adjusted relative to the seat-shell rear part.

As a result of the fact that the seat-shell front part and the seat-shell rear part are formed separately, and the seat-shell front part can be adjusted, in particular independently of the seat-shell rear part, the seat-shell front part can, for example, be adapted individually to the seat user in inclination and/or length of the seat surface. This increases the comfort. The seat surface is defined between the front edge of the seat cushion and the backrest. For a thigh support, it is sufficient if only the seat-shell front part is adjustable and the seat-shell rear part remains fixed, for example as part of a seat frame. It is advantageous for the seat cushion to rest on the seat-shell rear part and be fastened to the seat-shell front part. When the seat-shell front part is adjusted, the seat cushion can then move in a corresponding manner at the same time. In order to enable adjustment in a gap-free manner with the various seat-surface lengths, the seat cushion reaches, for example, a small distance below the backrest. The vehicle seat according to the invention can be used not only in the case of trucks, including coaches, but also in other types of vehicles.

In one preferred embodiment of the present invention, the seat-shell front part can be pivoted relative to the seat-shell rear part in order to adjust its inclination, for example by the seat-shell front part being arranged on a carrier plate which is coupled to the seat frame. The adjustment of the inclination preferably takes place pneumatically via an inflatable cushion which is arranged between the carrier plate and the seat frame. An embodiment of this type can be produced with little outlay on material and in terms of time and is thereby cost-effective. For the pneumatic actuation, the system can be connected to the compressed-air supply of the truck. However, the adjustment of the inclination can also take place hydraulically, electromechanically or manually.

In another preferred embodiment of the present invention, the seat-shell front part can be displaced relative to the seat-shell rear part in order to adjust the seat-surface length, for example by the seat-shell front part being displaceable relative to the carrier plate and being lockable. As a result and for example, a multi-adjustable vehicle seat is provided with few components. For reliable guiding during the seat-surface length adjustment, slideways are provided on the seat-shell front part and/or on the carrier plate. The seat-shell front part is preferably locked by means of a locking bar which is mounted movably on the carrier plate, is movable relative to the seat-shell front part and, for locking purposes, interacts with a toothed segment of the seat-shell front part. This makes reliable locking and easy unlocking possible. For better performance during a crash, the locking bar is advantageously movable transversely to the seat longitudinal direction. The locking bar can likewise be actuated pneumatically by the existing compressed-air supply.

BRIEF DESCRIPTION OF THE DRAWINGS

In the following, the invention is explained in more detail with reference to an exemplary embodiment illustrated in the drawings, in which:

FIG. 3 shows a plan view of a carrier plate in the direction of the arrow III in FIG. 4, FIG. 4 shows a front view of the seat frame and carrier plate in the direction of the arrow IV in FIGS. 2 and 3, and FIG. 5 shows a perspective view of a seat-shell front part.

DETAILED DESCRIPTION OF THE INVENTION

Figure 1:
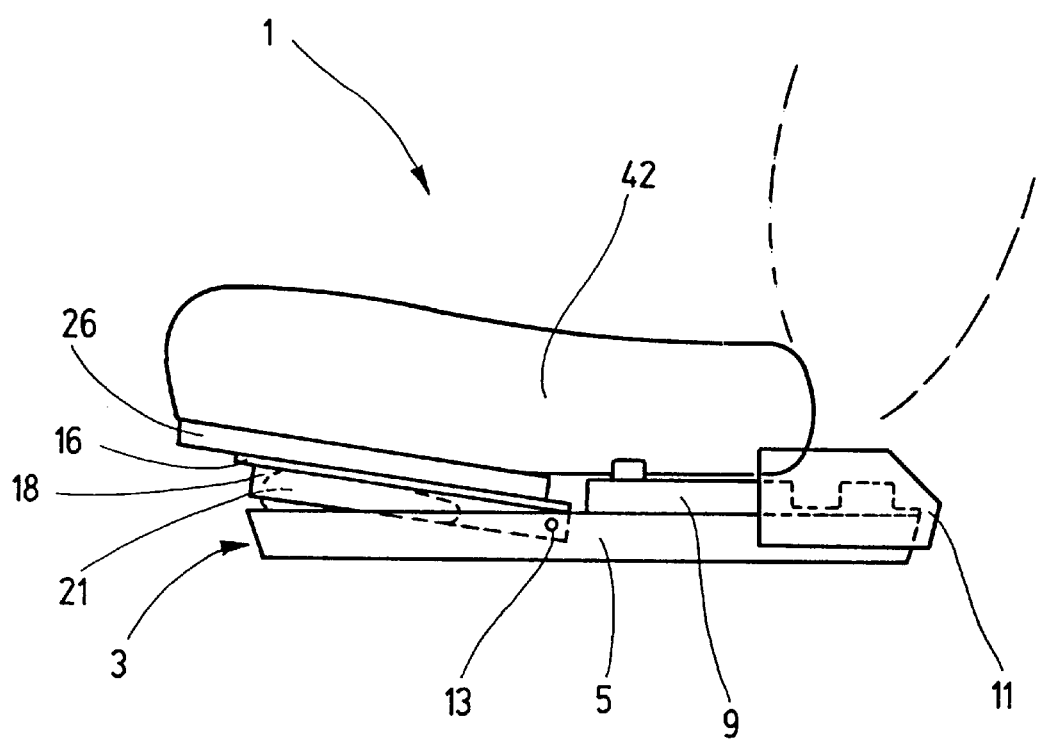
FIG. 1 shows a schematic side view of a vehicle seat according to one exemplary embodiment of the invention.
Figure 2:
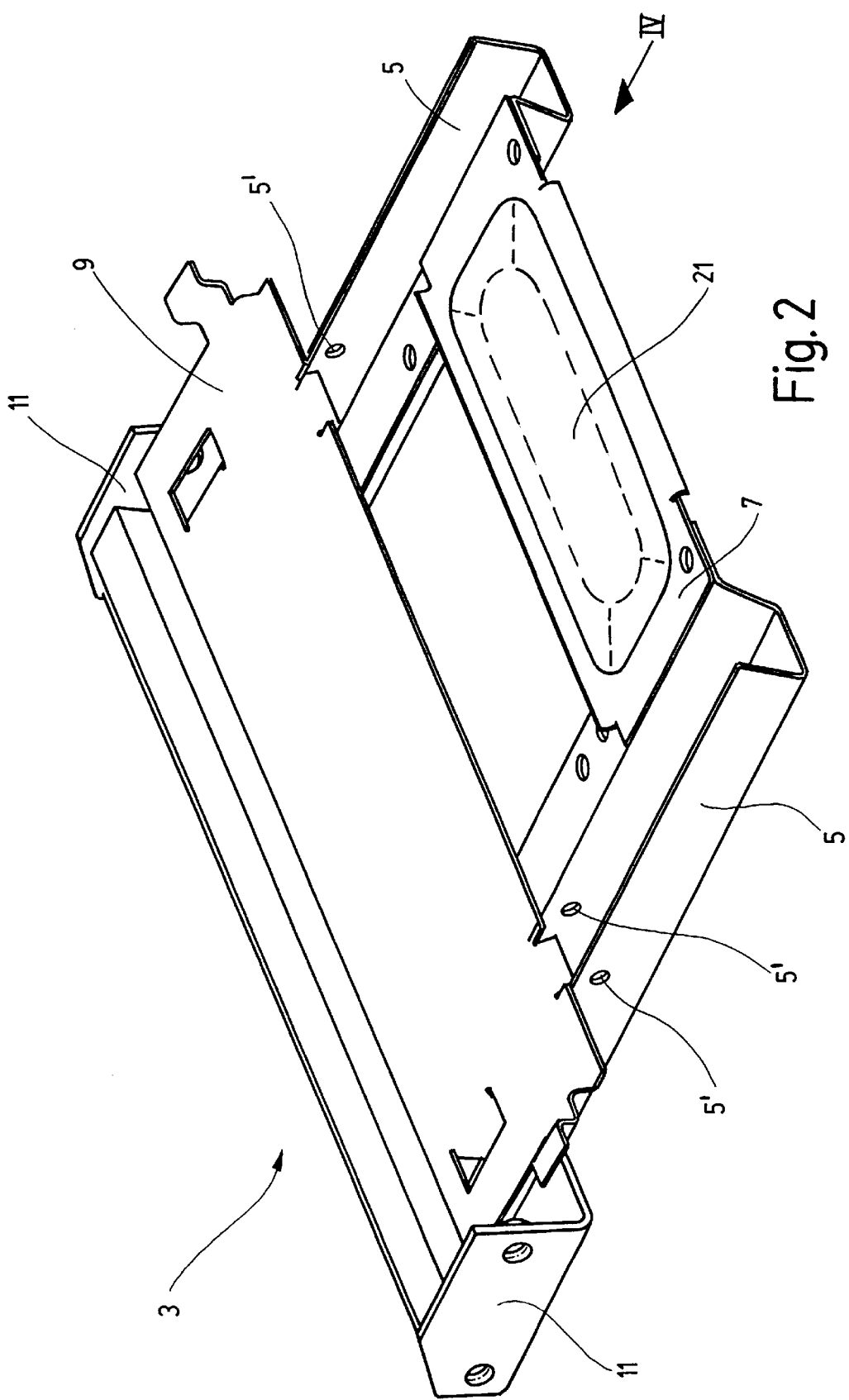
FIG. 2 shows a perspective view of a seat frame.

In accordance with one exemplary embodiment, a vehicle seat 1 is fitted in a truck as a driver's seat. The following directional indications refer to the orientation specified by the normal direction of travel. The vehicle seat 1 is provided with a steel seat frame 3 which has two parallel side parts 5, which are arranged in the longitudinal direction, have an essentially U-shaped profile, and are designed such that they are upwardly open; a planar connecting plate 7, which is arranged transversely to the side parts and connects the two side parts 5 in the front region on the upper side; an at least partially planar seat-shell rear part 9, which is arranged transversely to the two side parts 5 and connects the two side parts 5 in the rear region on the upper side; and two fastening plates 11 which are mounted laterally on the seat-shell rear part 9. The side parts 5 are connected on their lower side to the vehicle structure. The fastening plates 11 are provided with holes and welded-on nuts or with threaded holes in order to fasten a backrest structure to the seat frame 3.

On each limb of their U-shaped profile, the side parts 5 each have a hole 5' which is arranged, in the longitudinal direction, approximately in the center of the corresponding side part 5. The four holes 5' in total are all aligned transversely to the longitudinal direction and are flush with one another. A respective bearing bush 12 is inserted between the two holes 5' of each side part 5. A respective bearing bolt 13 is pushed through each bearing bush 12 and the relevant two holes 5' and is secured at its ends. The two bearing bushes 12 can be rotated relative to the two side parts 5 and the two bearing bolts 13.

An essentially planar carrier plate 16 has, on its lower side, two parallel U-profiles 18 running in the longitudinal direction. At its rear end, in the region of the rear edge of the carrier plate 16, one of the bearing bushes 12 is in each case inserted through each U-profile 18 and fastened. The carrier plate 16 can thereby be pivoted relative to the seat frame 3, the U-profile 18 at least partly fitting into the front half of the corresponding U-shaped profile of the side parts 5.

An inflatable cushion 21 is provided between the connecting plate 7 and the carrier plate 16, which cushion is connected via a connection to the compressed-air supply of the truck. By admission of compressed air, the cushion 21 can raise the carrier plate 16 and initiate a pivoting movement of the carrier plate 16, as a result of which the front edge of the carrier plate 16 is raised. Releasing compressed air out of the cushion 21 enables the carrier plate 16 to be lowered again. The releasing of the compressed air is assisted by the body weight of the seat user.

On its upper side, the carrier plate 16 has a respective slideway 24 above each U-profile 18. An essentially planar seat-shell front part 26, which is made of sheet metal and has a rounded front edge and raised border to the side and toward the front in order to attach the cover, has two parallel sliding fixtures 28 which are punched out of the material of the seat-shell front part 26. Each sliding fixture 28 holds a slideway 24. As a result, the seat-shell front part 26 can be displaced in the longitudinal direction relative to the carrier plate 16.

In order to secure a selected longitudinal adjustment of the seat-shell front part 26, the latter has, below an upwardly bent tooth covering 30, a toothed segment 32 whose teeth face toward the inside of the vehicle seat 1, i.e. toward the right seat side in the exemplary embodiment. The toothed segment 32 interacts with a movable locking bar 34. The locking bar 34 has a flat, elongated basic shape in the manner of a strip, the end sections 34' and 34" being bent upward or downward at right angles with respect to the basic shape.

The locking bar 34 is arranged and mounted movably on the lower side of the carrier plate 16 transversely to the longitudinal direction of the vehicle seat 1 between the center and the left seat side. The carrier plate 16 has two side guides 36 and a retaining guide 38, arranged between the side guides 36, the guides in each case being produced by pressing out of material, or else may be formed as a separate plastic part. The side guides 36 and the retaining guide 38 hold the locking bar 34 and are aligned in such a manner that the locking bar 34 is easily movable with little play. The side guides 36 are responsible for guiding in the plane parallel to the carrier plate 16 while the retaining guide 38 bears the weight of the locking bar 34 and keeps the latter bearing against the carrier plate 16, i.e. is responsible for guiding perpendicularly to the plane of the carrier plate 16.

The upwardly bent end section 34' of the locking bar 34 protrudes as far as the upper side of the carrier plate 16 through the side guide 36, which is situated further inward, or through an adjacent aperture 40 of the carrier plate 16, the aperture 40 being provided for installation of the locking bar 34. This end section 34' is provided with a latching opening or the like with which it can interact with one of the teeth of the toothed segment 32. The downwardly bent end section 34" of the locking bar 34 is arranged a sufficient distance on the left border of the carrier plate 16 that it comes to lie outside the side parts 5 irrespective of the pivoting position of the carrier plate 16.

By admission of compressed air to a pneumatic actuator 35, which is illustrated schematically in FIG. 4 and is positioned proximate the end section 34", the locking bar 34 can be pressed away inward by a tooth of the toothed segment 32, so that the seat-shell front part 26 is unlocked and can be displaced with respect to the carrier plate 16 and can be adjusted in length. The locking bar 34 is pushed back outward by spring force, thereby locking the toothed segment 32 and therefore securing the seat-shell front part 26 on the carrier plate 16.

The front part of a seat cushion 42 is mounted on the seat-shell front part 26. A panel (not illustrated in the drawing) made of plastic is mounted along the border of the carrier plate 16. The rear part of the seat cushion 42 rests loosely on the seat-shell rear part 9. A backrest, which is only outlined in FIG. 1, is arranged above the rear end section of the seat cushion 42. The seat cushion 42 is sufficiently long that, even when the length of the seat surface is at its largest, there is still no vertical gap between the seat cushion 42 and backrest. The described pivoting of the carrier plate 16 by means of the cushion 21 enables the seat-surface inclination of the seat cushion 42, in particular the thigh support, to be pneumatically adjusted. The described displacement of the seat-shell front part 26 and the pneumatic unlocking and locking by means of the locking bar 34 enable the seat-surface length of the seat cushion 42 to be adjusted. The wiring and valve system necessary for the pneumatic adjustment is not illustrated in the drawing.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An adjustable vehicle seat, comprising:
   a seat-shell rear part;
   a seat-shell front part formed separately from the seat-shell rear part and mounted for moving in a longitudinal direction relative to the seat-sell rear part, so that the seat-shell front part can be moved relative to the seat-shell rear part to adjust a seat-surface length of the adjustable vehicle seat, wherein the seat surface length extends in the longitudinal direction between forward and rearward portions of the adjustable vehicle seat, and the seat-shell rear part is positioned rearwardly of the seat-shell front part; and
   a seat cushion positioned on both the seat-shell front part and the seat-shell rear part, with the seat cushion extending rearwardly from a rear edge of the seat-shell front part so that a rear part of the seat cushion is positioned on the seat-shell rear part, which is positioned rearwardly of the seat-shell front part.

2. The adjustable vehicle seat as claimed in claim 1, wherein the seat cushion movably rests on the seat-shell rear part and is fastened to the seat-shell front part so that the cushion moves with the seat-shell front part.

3. The adjustable vehicle seat as claimed in claim 2, wherein the rear part of the seat cushion engages and rests loosely on the seat-shell rear part.

4. The adjustable vehicle seat as claimed in claim 1, further comprising a seat frame, wherein the seat-shell rear part is part of the seat frame.

5. The adjustable vehicle seat as claimed in claim 4, wherein the seat-shell front part is mounted for pivoting relative to the seat-shell rear part so that inclination of the seat-shell front part can be adjusted relative to the seat-shell rear part.

6. The adjustable vehicle seat as claimed in claim 5, further comprising a carrier plate which is coupled to the seat frame, wherein the seat-shell front part is arranged on the carrier plate.

7. The adjustable vehicle seat as claimed in claim 6, wherein the carrier plate is pivotably coupled to the seat frame.

8. The adjustable vehicle seat as claimed in claim 6, further comprising an inflatable cushion positioned between the carrier plate and the seat frame, and operative for pneumatically adjusting the inclination of the seat-shell front part.

9. The adjustable vehicle sea as claimed in claim 6, wherein the seat-shell front part is mounted so that the seat-shell front part can be displaced relative to the carrier plate to adjust the seat-surface length, and wherein the adjustable vehicle seat further comprises a locking mechanism for selectively restricting and allowing movement of the seat-shell front part relative to the carrier plate.

10. The adjustable vehicle seat as claimed in claim 1, wherein the seat-shell front part is mounted for pivoting relative to the seat-shell rear part so that inclination of the seat-shell front part can be adjusted relative to the seat-shell rear part.

11. An adjustable vehicle seat, comprising:

a seat-shell rear part that is part of a frame of the vehicle seat;

a seat-shell front part formed separately from the seat-shell rear part and mounted for pivoting relative to the seat-shell rear part, so that the inclination of the seat-shell front part can be adjusted relative to the seat-shell rear part;

a seat cushion positioned on both the seat-shell front part and the seat-shell rear part;

a carrier plate coupled to the frame, wherein the seat-shell front part is arranged on the carrier plate; and an inflatable cushion positioned between the carrier plate and the frame, and operative for pneumatically adjusting the inclination of the seat-shell front part.

12. The adjustable vehicle seat as clawed in claim 11 wherein the seat-shell front pant is mounted so that the seat-shell front part can be displaced relative to the seat-shell rear part to adjust a seat-surface length of the adjustable vehicle seat.

13. An adjustable vehicle seat, comprising:

a seat-shell rear part that is part of a frame of the vehicle seat;

a seat-shell front part formed separately from the seat-shell rear part and mounted for pivoting relative to the seat-shell rear part, so that inclination of the seat-shell front part can be adjusted relative to the seat-shell rear part;

a seat cushion positioned on both the seat-shell front part and the seat-shell rear part;

a carrier plate coupled to the frame, wherein the seat-shell front part is arranged on the carrier plate so that the seat-shell front part can be displaced relative to the carrier plate so as to displace the seat-shell front part relative to the seat-shell rear part to adjust a seat-surface length of the adjustable vehicle seat; and a locking mechanism for selectively restricting and allowing movement of the seat-shell front part relative to the carrier plate.

14. The adjustable vehicle seat as claimed in claim 13, wherein:

the seat-shell front part comprises a toothed segment; and the locking mechanism comprises a locking bar movably mounted on the carrier plate and movable relative to the seat-shell front part for selectively interacting with the toothed segment of the seat-shell font part to restrict movement of the seat-shell front part relative to the carrier plate.

15. The adjustable vehicle seat as claimed in claim 14, further comprising a pneumatic actuator operative for moving the locking bar relative to the seat-shell front part.

16. The adjustable vehicle seat as claimed in claim 13, wherein the carrier plate is pivotably coupled to the seat frame and the seat-shell front part is mounted to the carrier plate for pivoting with the carrier plate relative to the seat-shell rear part to adjust all inclination of the seat-shell front part relative to the seat-shell rear part.

* * * * *

UNITED STATES PATENT AND TRADEMARK OFFICE
CERTIFICATE OF CORRECTION

PATENT NO. : 6,386,633 B1
DATED : May 14, 2002
INVENTOR(S) : Newton

It is certified that error appears in the above-identified patent and that said Letters Patent is hereby corrected as shown below:

Column 4,
Line 30, "seat-sell" should read -- seat-shell --.

Column 5,
Line 4, "sea" should read -- seat --;
Line 32, "clawed" should read -- claimed --.

Column 6,
Line 26, "font" should read -- front --.

Signed and Sealed this

Twenty-third Day of July, 2002

*Attest:*

JAMES E. ROGAN
*Attesting Officer*   *Director of the United States Patent and Trademark Office*